Patented Apr. 12, 1927.

1,624,723

UNITED STATES PATENT OFFICE.

HAROLD WALTER ELLEY AND DONALD HOWARD POWERS, OF WILMINGTON, DELAWARE, ASSIGNORS TO E. I. DU PONT DE NEMOURS & COMPANY, OF WILMINGTON, DELAWARE, A CORPORATION OF DELAWARE.

VULCANIZATION ACCELERATOR AND PROCESS OF MAKING SAME.

No Drawing.   Application filed December 2, 1924. Serial No. 753,524.

This invention relates to a new class of substances having most probably the following novel heterocyclic nucleus:

The simplest saturated member of this class of substances would have the following structural formula:

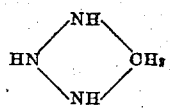

which may be designated hydraziminomethane.

The members of this class in which we are at present more particularly interested are those which possess radicals which render the substances, or certain of their decomposition products, valuable as rubber-vulcanization accelerators. Some of the members of said class of substances having this property of accelerating vulcanization are characterized by having most probably the following atomic grouping:

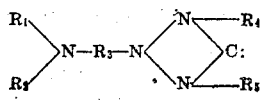

where $R_1$, $R_2$, $R_4$, and $R_5$ are organic radicals, and $R_3$ is a divalent organic radical. Those members which we have so far found most useful as accelerators have the following general, incomplete, structural formula:

where $R_1$ represents an alkyl radical such, for example, as methyl, ethyl, propyl, butyl, or amyl; $R_4$ and $R_5$ stand for alkyl or aryl radicals; and $R_6$ stands for hydrogen or an organic radical. Substances of this type may be produced in general by first condensing one molecular proportion of a nitroso-dialkyl- (or diaryl-) aniline with two molecular proportions of a primary amine to produce a compound having most probably the formula and then condensing this product with a compound containing a reactive methylene group.

For example when para-nitroso-dimethyl-aniline is condensed with two equivalents of aniline, a product is obtained which reacts vigorously with formaldehyde to give a condensation product which shows remarkably high curing power, superior to a cure obtained from nitroso-dimethylaniline condensed with formaldehyde, aniline condensed with formaldehyde, or a mixture of these products. The course of this reaction is probably as follows:

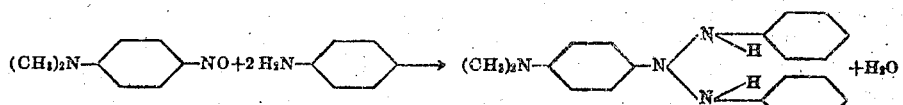

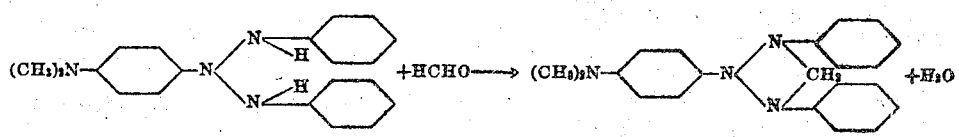

The formation of this product is by no means limited to this method of preparation; for example it may also be prepared by treating nitroso-dimethylaniline with methylene-dianilide

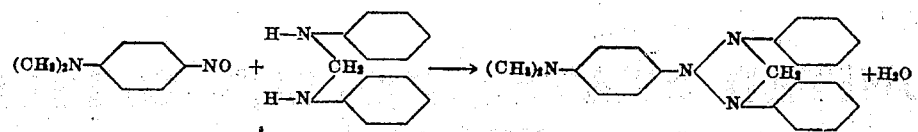

The resulting condensation product shows exceedingly high curing powers superior to nitroso-dimethylaniline, methylene-dianilide, or a mechanical mixture of the two.

The condensation product of nitroso-dimethylaniline, toluidine, and formaldehyde has been found to have extremely high curing powers. This product may be prepared in the following manner. Four hundred and seventy-two pounds of ortho-toluidine are heated to 275° F. and three hundred and nine pounds of para-nitroso-dimethylaniline are slowly run in while the mixture is vigorously agitated. About fifteen minutes after the nitroso-dimethyaniline has been added, concentrated aqueous formaldehyde solution weighing approximately two hundred pounds is run in. At the end of an hour the mix is run off and dried at 260° F. When tested in the following mixture a tensile strength of three thousand three hundred and sixty pounds was obtained with an elongation of eight hundred and thirty per cent.

|  | Parts. |
|---|---|
| Smoked sheet | 50 |
| Amber crépe | 50 |
| Zinc oxide | 6.05 |
| Sulphur | 4.34 |
| Accelerator | .75 |

Cured for sixty minutes at forty pounds steam pressure.

In producing the new substances the reagent which is to be condensed with the nitroso-compound may be practically any primary amine, for example methyl-, ethyl-, propyl-, butyl-, benzyl-, phenyl-, or tolyl-, amine. For the last reaction, to complete the formation of the hydraziminomethane ring, there may be used, in place of formaldehyde, other reactive-methylene-containing compounds such as the polymeric forms of formaldehyde (for example, para-formaldehyde), the aldehyde-ammonias, hexamethylene-tetramine, and methylene-dichloride; and the expression "reactive-methylene-containing compound" is also used to include the aldehydes in general such as acetaldehyde, butyraldehyde, benzaldehyde, furfuraldehyde, etc., as well as the alkylidene dihalides (for example, butylidene dibromide, benzylidene dichloride, etc.).

We have found, for instance, that the product obtained by condensation of two molecular equivalents of a primary aromatic amine (for example, aniline or o-toluidine) with one molecular equivalent of para-nitroso-dimethylaniline, followed by condensation with acetaldehyde, possesses, to a certain extent, the power to accelerate vulcanization of rubber, but it is not as valuable in this respect as when the acetaldehyde is replaced by formaldehyde. This latter product on the other hand is found to be inferior in accelerating power to a product obtained by condensation of para-nitroso-dimethylaniline with an aliphatic primary amine, such as butyl-amine, followed by condensation of the resulting product with an aliphatic aldehyde such as formaldehyde.

We claim:

1. A composition comprising a hydraziminomethane compound.

2. A composition comprising a substance whose molecules contain the following heterocyclic ring:

3. A composition comprising a substance whose molecules contain the following atomic grouping:

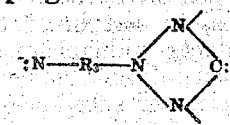

where $R_3$ represents a divalent organic radical.

4. A composition comprising a substance whose molecules contain the following atomic grouping:

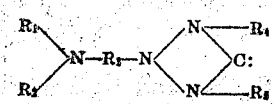

where $R_1$, $R_2$, $R_4$, and $R_5$ represent organic radicals, and $R_3$ stands for a divalent organic radical.

5. A composition comprising a substance whose molecules contain the following atomic grouping:

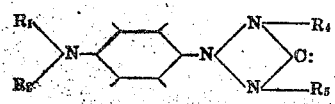

where $R_1$, $R_2$, $R_4$, and $R_5$ represent alkyl radicals.

6. A composition comprising a substance whose molecules contain the following atomic grouping:

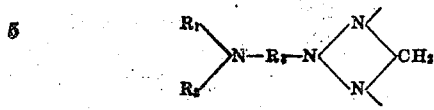

where $R_1$, $R_2$, and $R_3$ represent organic radicals.

7. A composition comprising a substance obtainable by condensing one molecular proportion of a nitroso-dialkylaniline with two molecular proportions of a primary amine, and condensing the resulting product with one molecular proportion of a compound containing a reactive-methylene group, the molecules of said substance having most probably the following graphical formula:

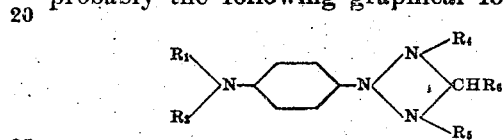

where $R_1$ and $R_2$ represent alkyl radicals, $R_4$ and $R_5$ represent organic radicals, and $R_6$ stands for hydrogen or an organic radical.

8. A composition as defined in claim 7 in which the primary amine is an aliphatic amine, and the compound containing a reactive-methylene- group is a reactive aliphatic aldehyde.

9. A composition comprising rubber mixed with a hydraziminomethane compound.

10. A composition comprising rubber mixed with a substance whose molecules contain the following heterocyclic ring:

11. A composition as defined in claim 3 which includes rubber mixed with said substance.

12. A composition as defined in claim 4 which includes rubber mixed with the substance described in said claim.

13. A composition as defined in claim 5 which includes rubber as the major component thereof.

14. Vulcanized rubber derived from rubber combined with a vulcanizing agent and a substance whose molecules contain the atomic grouping:

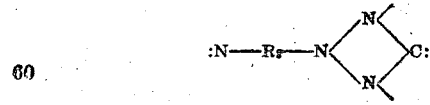

where $R_3$ represents a divalent organic radical.

15. Vulcanized rubber derived from rubber combined with a vulcanizing agent and a substance whose molecules contain the atomic grouping:

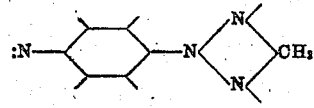

16. Vulcanized rubber derived from rubber combined with a vlucanizing agent and a substance whose molecules contain the atomic grouping:

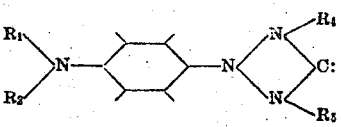

where $R_1$, $R_2$, $R_4$, and $R_5$ represent organic radicals.

17. Vulcanized rubber derived from rubber combined with a vulcanizing agent and a substance whose molecules contain the atomic grouping:

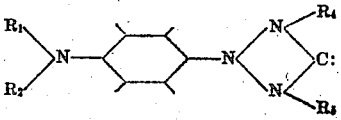

where $R_1$, $R_2$, $R_4$, and $R_5$ represent alkyl radicals.

18. The process of treating rubber which comprises combining with rubber a vulcanizing agent and a hydraziminomethane compound, and vulcanizing the rubber.

19. The process of treating rubber which comprises mixing with the rubber a vulcanizing agent and the product obtainable by condensing a nitroso-dialkyl-amino compound with a primary amine and condensing the resulting amino-hydrazine derivative with a reactive aldehyde, and subjecting the mixture thus formed to vulcanization.

20. The process of treating rubber which comprises mixing with the rubber a vulcanizing agent and the product obtainable by condensing a nitroso-dialkyl-amino compound with an alkylamine and a reactive aliphatic aldehyde, and subjecting the mixture thus formed to vulcanization.

21. The process of treating rubber which comprises mixing with the rubber a vulcanizing agent and the organic compound resulting from the action of a reactive aldehyde on the condensation product of a para-nitroso-dialkylaniline and a primary amine, and vulcanizing the mixture.

22. The process of preparing an accelerator which comprises combining two molecular proportions of a primary amine with one molecular proportion of a nitroso-disubstituted-amino compound, and treating the resulting product with a substance containing a reactive methylene group.

23. The process of preparing an acelerator which comprises combining two molecular proportions of a primary amine with one molecular proportion of a nitroso-disubstituted-amino compound, and treating the resulting product with a reactive aldehyde.

24. The process of preparing an accelerator which comprises combining two molecular proportions of a primary amine with one molecular proportion of a nitroso-disubstituted-amino compound, and treating the resulting product with formaldehyde.

25. The process of preparing an accelerator which comprises combining two molecular proportions of a primary amine with one molecular proportion of a para-nitroso-dialkylaniline to form an amino-hydrazine derivative, and condensing the latter with a reactive aldehyde.

26. The process of preparing an accelerator which comprises combining two molecular proportions of an aliphatic primary amine with one molecular proportion of a nitroso-dialkylaniline to form an amino-hydrazine derivative, and condensing the latter with a compound containing a reactive-methylene group.

27. A process as defined in claim 26 in which the amino-hydrazine derivative is condensed with a reactive aldehyde.

28. A process as defined in claim 26 in which the amino-hydrazine derivative is condensed with formaldehyde.

29. Vulcanized rubber obtainable by subjecting to a vulcanization temperature and pressure a rubber mix comprising rubber, sulphur, zinc oxide and an accelerator whose molecules contain the following atomic grouping:

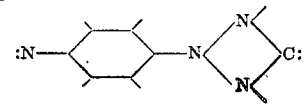

In testimony whereof we affix our signatures.

HAROLD WALTER ELLEY.
DONALD HOWARD POWERS.